Dec. 25, 1956 F. E. BACHMAN 2,775,322
BRAKE ROTOR
Filed March 10, 1953 2 Sheets-Sheet 2

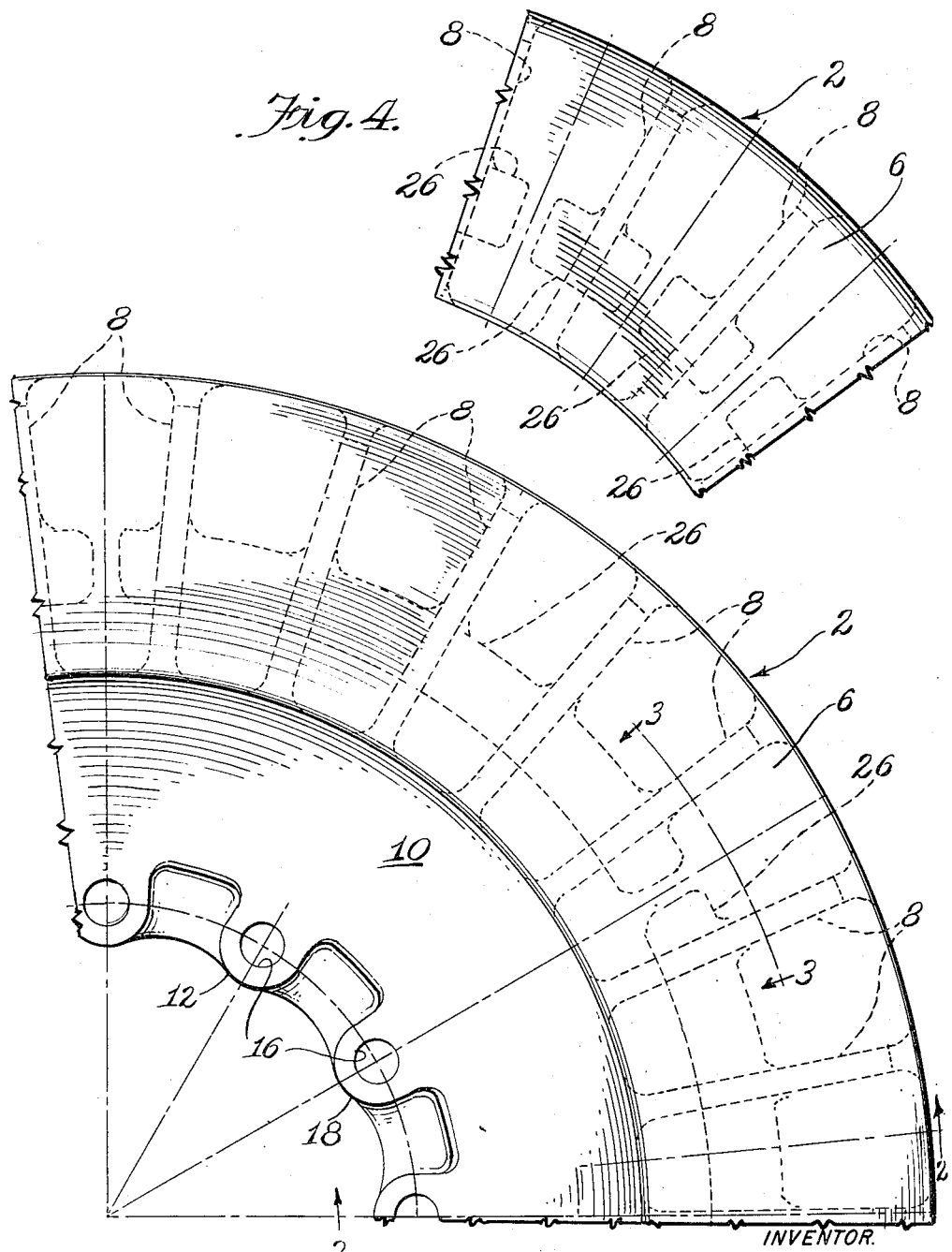

INVENTOR.
Fred E. Bachman
BY O. B. Garner
Attorney

United States Patent Office 2,775,322
Patented Dec. 25, 1956

2,775,322

BRAKE ROTOR

Fred E. Bachman, Granite City, Ill., assignor to American Steel Foundries, Chicago, Ill., a corporation of New Jersey Application March 10, 1953, Serial No. 341,518

4 Claims. (Cl. 188—218)

This invention relates to brakes and more particularly to a novel brake disk or rotor such as is commonly utilized on the axle of a railway vehicle for association with brake means.

A primary object of the invention is to devise a novel brake rotor of the centrifugal or peripheral blower type, wherein air or any other fluid medium in which the rotor may operate is drawn into the radially inner perimeter of a brake ring and is impelled from the radially outer perimeter thereof.

A more specific object of the invention is to increase the heat dissipating characteristics of such a rotor.

A further object of the invention is to provide deflectors within the fluid chamber of the rotor between its spaced brake rings which are engageable by associated brake means.

Still another object of the invention is to provide deflectors, such as above described, which are particularly adapted to create turbulence in the fluid medium flowing through the brake rotor thereby increasing its heat dissipating efficiency.

The foregoing and other objects and advantages of the invention will become apparent from a consideration of the following specification and the accompanying drawings, wherein:

Figure 1 is a fragmentary side elevational view of a brake rotor embodying the invention, only one-quarter of the structure being shown inasmuch as it is a symmetrical annular structure;

Figure 4 is a fragmentary side elevational view similar to Figure 1 but showing a modification of the invention.

Figure 3:
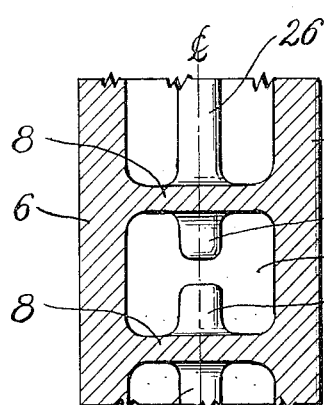
Figure 3 is a sectional view on the line 3—3 of Figure 1.
Figure 2:
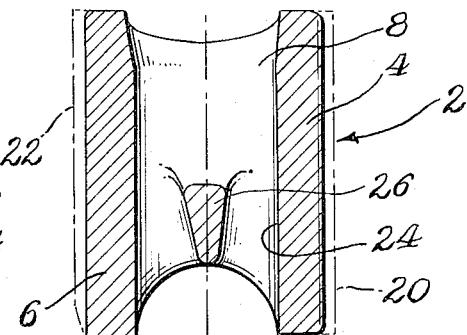
Figure 2 is a sectional view on the line 2—2 of Figure 1.

Describing the invention in detail and referring first to the embodiment thereof illustrated in Figures 1 to 3, inclusive, it will be seen that the novel brake rotor comprises a brake ring generally designated 2 having spaced annular friction plates or disks 4 and 6 interconnected by a plurality of spaced substantially radial blades 8 which are preferably cast integral with the plates 4 and 6.

The radially inner perimeter of the annular plate 6 is connected to a bell-shaped web 10, the radially inner extremity of which is formed with a hub 12 having a bore 14 adapted to receive the hub of an associated rotatable member (not shown) to be braked, said member being attached to the hub 12 by associated securing means, such as studs (not shown) extending through openings 16 in bosses 18 of the hub 12.

If desired, the remote faces of the friction plates 4 and 6 may be provided with friction material indicated at 20 and 22, respectively, by phantom lines; however, it will be understood that, depending upon the desired materials, braking may be accomplished directly on the remote faces of the plates 4 and 6.

As will be readily understood by those skilled in the art, such braking develops intense heat in the plates 4 and 6, and this heat is dissipated by a fluid medium, normally atmosphere, which is drawn into a fluid chamber 24 between the plates 4 and 6 and is expelled from the radially outer perimeter of said chamber to remove braking heat from the plates.

According to the present invention, it has been discovered that this heat dissipating function of the brake rotor may be increased by providing deflectors 26 between the plates 4 and 6 and preferably parallel thereto, the deflectors being preferably attached to the blades 8 and tapering radially inwardly of the brake ring 2. Preferably, these deflectors are cast integrally with the blades 8 but may be attached thereto in any desired manner.

As best seen in Figures 1 and 3, the deflectors 26 may be utilized to increase the rigidity of the structure by connecting a plurality of the blades 8.

In the embodiment of Figure 4, each deflector 26 is carried by one blade 8 and is spaced from the deflectors 26 of the adjacent blades. The structure is otherwise preferably identical with that disclosed in Figures 1 to 3.

Figure 5:
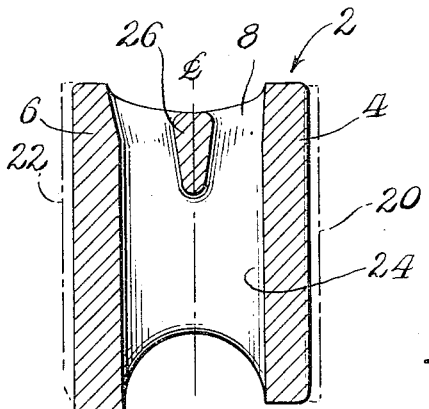
Figure 5 is a sectional view similar to Figure 2 and illustrating another modification of the invention.

In the modification of Figure 5, the deflectors 26 are disposed at the radially outer perimeters of the blades 8, whereas in the preceding embodiments, the deflectors are arranged at the radially inner perimeters of the blades. The modification of Figure 5 is otherwise preferably identical with that disclosed in Figures 1 to 3, although it will be understood that, if desired, the deflectors 26 of Figure 5 may be provided on individual blades 8, as in the modification of Figure 4.

I claim:

1. A brake rotor comprising a hub, a bell-shaped concavo-convex web flaring axially radially from said hub, an outer ring plate supported on the outer peripheral end of said web and integral therewith, an inner ring plate axially spaced from said outer plate and radially spaced from and encircling said web to define therewith an annular fluid inlet, radially extending circumferentially spaced blades interconnecting said plates to define therewith a plurality of radially extending fluid passages communicating with said inlet, fluid deflectors provided on said blades adjacent the inner ends of the latter operative to deflect fluid toward and to increase the flow of fluid along the inner opposed sides of said plates responsive to rotation of the rotor, adjacent deflectors being spaced from each other centrally of their respective passages.

2. A brake rotor comprising a hub, a bell-shaped web flaring axially radially from said hub, an outer ring plate supported on the outer peripheral end of said web and integral therewith, an inner ring plate axially spaced from said outer plate and radially spaced from and encircling said web to define therewith an annular fluid inlet, radially extending circumferentially spaced blades interconnecting said plates to define therewith a plurality of radially extending fluid passages communicating with said inlet, fluid deflectors of wedge section integral with said blades disposed adjacent the inner ends of the latter operative to deflect fluid toward and to increase the flow of fluid along the inner opposed sides of said plates responsive to rotation of the rotor, the inner radial edge of each blade being concave and merging with the inner radial portions of said deflectors and plates, adjacent deflectors being spaced from each other centrally of their respective passages.

3. A brake rotor comprising a hub, a bell-shaped web flaring axially radially from said hub, an outer ring plate supported on the outer peripheral end of said web and integral therewith, an inner ring plate axially spaced from said outer plate and radially spaced from and encircling said web to define therewith an annular fluid inlet, radially extending circumferentially spaced blades interconnecting said plates to define therewith a plurality of radially extending fluid passages communicating with said inlet, fluid deflectors provided on said blades intermediate the inner and outer ends of the latter operative to deflect fluid toward and to increase the flow of fluid along the inner opposed sides of said plates responsive to rotation of the rotor, adjacent deflectors being spaced from each other centrally of their respective passages.

4. A brake rotor comprising a hub, a bell-shaped web flaring axially radially from said hub, an outer ring plate supported on the outer peripheral end of said web and integral therewith, an inner ring plate axially spaced from said outer plate and radially spaced from and encircling said web to define therewith an annular fluid inlet, radially extending circumferentially spaced blades interconnecting said plates to define therewith a plurality of radially extending fluid passages communicating with said inlet, fluid deflectors provided on said blades intermediate the inner and outer ends of the latter operative to deflect fluid toward and to increase the flow of fluid along the inner opposed sides of said plates responsive to rotation of the rotor, the area of said inlet being greater than the combined area of said passages to increase the velocity of fluid flow through the latter, said deflectors having side surfaces diverging outwardly radially from the axis of the rotor to deflect fluid toward the inner surfaces of said plates, adjacent deflectors being spaced from each other centrally of their respective passages.

References Cited in the file of this patent

UNITED STATES PATENTS

| | | |
|---|---|---|
| 2,233,594 | Eksergian | Mar. 4, 1941 |
| 2,255,023 | Eksergian | Sept. 2, 1941 |
| 2,255,024 | Eksergian | Sept. 2, 1941 |
| 2,369,328 | Watts | Feb. 13, 1945 |
| 2,587,047 | Kelley | Feb. 26, 1952 |